United States Patent
Subramanya et al.

(10) Patent No.: US 9,697,475 B1
(45) Date of Patent: Jul. 4, 2017

(54) ADDITIVE CONTEXT MODEL FOR ENTITY RESOLUTION

(71) Applicant: GOOGLE INC., Mountain View, CA (US)

(72) Inventors: Amarnag Subramanya, Sunnyvale, CA (US); Michael Ringgaard, Lystrup (DK); Fernando Carlos das Neves Pereira, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 591 days.

(21) Appl. No.: 14/138,606

(22) Filed: Dec. 23, 2013

Related U.S. Application Data (60) Provisional application No. 61/915,356, filed on Dec. 12, 2013.

(51) Int. Cl.
*G06N 99/00* (2010.01)

(52) U.S. Cl.
CPC .................... *G06N 99/005* (2013.01)

(58) Field of Classification Search
None
See application file for complete search history.

(56) References Cited

U.S. PATENT DOCUMENTS

| | | | | |
|---|---|---|---|---|
| 8,086,549 B2 * | 12/2011 | Qi | ....... | G06N 99/005 706/14 |
| 8,630,975 B1 * | 1/2014 | Guo | ....... | G06N 7/005 707/608 |
| 8,886,576 B1 * | 11/2014 | Sanketi | ........... | G06F 17/30038 706/12 |
| 2009/0282012 A1 * | 11/2009 | Konig | ........... | G06F 17/278 |
| 2010/0262568 A1 | 10/2010 | Schwaighofer et al. | | |
| 2010/0293195 A1 | 11/2010 | Houghton | | |
| 2012/0226639 A1 | 9/2012 | Burdick et al. | | |

(Continued)

FOREIGN PATENT DOCUMENTS

WO 2011160205 A1 12/2011

OTHER PUBLICATIONS

Fountain, Trevor, and Mirella Lapata. "Incremental models of natural language category acquisition." Proceedings of the 32st Annual Conference of the Cognitive Science Society. 2011.*

(Continued)

*Primary Examiner* — Stanley K Hill
*Assistant Examiner* — David H Kim
(74) *Attorney, Agent, or Firm* — Brake Hughes Bellermann LLP (57) ABSTRACT

Systems and methods are disclosed for using an additive context model for entity disambiguation. An example method may include receiving a span of text from a document and a phrase vector for the span. The phrase vector may have a quantity of features and represent a context for the span. The method also includes determining a quantity of candidate entities from a knowledge base that have been referred to by the span. For each of the quantity of candidate entities, the method may include determining a support score for the candidate entity for each feature in the phrase vector, combining the support scores additively, and computing a probability that the span resolves to the candidate entity given the context. The method may also include resolving the span to a candidate entity with a highest probability.

20 Claims, 7 Drawing Sheets

(56) References Cited

U.S. PATENT DOCUMENTS

| | | |
|---|---|---|
| 2012/0284791 A1 | 11/2012 | Miller et al. |
| 2014/0143251 A1* | 5/2014 | Wang ............... G06F 17/30598 707/737 |

OTHER PUBLICATIONS

Parisien, Christopher, Afsaneh Fazly, and Suzanne Stevenson. "An incremental Bayesian model for learning syntactic categories." Proceedings of the twelfth conference on computational natural language learning. Association for Computational Linguistics, 2008.*

Frermann, Lea, and Mirella Lapata. "Incremental Bayesian Learning of Semantic Categories." EACL. 2014.*

Liu, Rey-Long, and Yun-Ling Lu. "Incremental context mining for adaptive document classification." Proceedings of the eighth ACM SIGKDD international conference on Knowledge discovery and data mining. ACM, 2002.*

Chu, et al, "Map-Reduce for Machine Learning on Multicore", In NIPS, 2006, pp. 281-288.

Friedman, et al, "Additive Logistic Regression: A Statistical View of Boosting", Special Invited Paper, The Annals of Statistics, vol. 28, No. 2, 2000, pp. 337-407.

"Ambiverse: AIDA: Accurate Online Disambiguation of Named Entities in Text and Tables", Max Planck Institut Informatik, available online at http://www.mpi-inf.mpg.de/departments/databases-and-information-systems/research/yago-naga/aida/, 2013, 4 pages.

Baluja et al., "Video Suggestion and Discovery for YouTube: Taking Random Walks Through the View Graph", International Conference on World Wide Web (WWW 2008), Apr. 21-25, 2008, 10 pages.

Bollacker et al., "Freebase: A Collaboratively Created Graph Database for Structuring Human Knowledge", Proceedings of the ACM SIGMOD International Conference on Management of Data, Jun. 9-12, 2008, pp. 1247-1249.

Bunescu et al., "Using Encyclopedic Knowledge for Named Entity Disambiguation", Proceedings of the 11th Conference of the European Chapter of the Association for Computational Linguistics, Apr. 2006, pp. 9-16.

Cucerzan, Silviu, "Large-Scale Named Entity Disambiguation Based on Wikipedia Data", Proceedings of Joint Conference on Empirical Methods in Natural Language Processing and Computational Natural Language Learning, Jun. 2007, pp. 708-716.

Dredze et al., "Entity Disambiguation for Knowledge Base Population", Proceedings of the 23rd International Conference on Computational Linguistics, Aug. 2010, pp. 277-285.

Duchi et al., "Efficient Online and Batch Learning Using Forward Backward Splitting", Journal of Machine Learning Research, vol. 10, 2009, pp. 2899-2934.

Ferragina et al., "TAGME: On-the-fly Annotation of Short Text Fragments (by Wikipedia Entities)", Proceedings of the 19th ACM International Conference on Information and Knowledge Management, Oct. 26-30, 2010, pp. 1625-1628.

Finin et al., "Using Wikitology for Cross-Document Entity Coreference Resolution", Association for the Advancement of Artificial Intelligence, 2009, pp. 29-35.

Finkel et al., "Incorporating Non-local Information into Information Extraction Systems by Gibbs Sampling", Proceedings of the 43rd Annual Meeting of the ACL, Jun. 2005, 363-370.

Gabrilovich et al., "Harnessing the Expertise of 70,000 Human Editors: Knowledge-Based Feature Generation for Text Categorization", Journal of Machine Learning Research, vol. 8, 2007, pp. 2297-2345.

Hachey et al., "Evaluating Entity Linking with Wikipedia", Artificial Intelligence, vol. 194, 2013, pp. 130-150.

Haghighi et al., "Simple Coreference Resolution with Rich Syntactic and Semantic Features", Proceedings of Conference on Empirical Methods in Natural Language Processing, Aug. 6-7, 2009, pp. 1152-1161.

Han et al., "A Generative Entity-Mention Model for Linking Entities with Knowledge Base", Proceedings of the 49th Annual Meeting of the Association for Computational Linguistics: Human Language Technologies—vol. 1, Jun. 19-24, 2011, pp. 945-954.

Han et al., "An Entity-Topic Model for Entity Linking", Proceedings of the 2012 Joint Conference on Empirical Methods in Natural Language Processing and Computational Natural Language Learning, Jul. 12-14, 2012, pp. 105-115.

Han et al., "Named Entity Disambiguation by Leveraging Wikipedia Semantic Knowledge", Proceedings of the 18th ACM Conference on Information and Knowledge Management, Nov. 2-6, 2009, pp. 215-224.

Hoffart et al., "Robust Disambiguation of Named Entities in Text", Proceedings of Conference on Empirical Methods in Natural Language Processing, Jul. 27-31, 2011, pp. 782-792.

Kulkarni et al., "Collective Annotation of Wikipedia Entities in Web Text", Proceedings of the 15th ACM International Conference on Knowledge Discovery and Data Mining, Jun. 28-Jul. 1, 2009, pp. 457-466.

Kwiatkowski et al., "Lexical Generalization in CCG Grammar Induction for Semantic Parsing", Proceedings of Conference on Empirical Methods in Natural Language Processing, Jul. 27-31, 2011, pp. 1512-1523.

Lin et al., "Entity Linking at Web Scale", Proc. of the Joint Workshop on Automatic Knowledge Base Construction & Web-scale Knowledge Extraction, Jun. 7-8, 2012, pp. 84-88.

Mayfield et al., "Cross-Document Coreference Resolution: A Key Technology for Learning by Reading", Spring Symposium on Learning by Reading and Learning to Read, Mar. 2009, 6 pages.

Mihalcea et al., "Wikify! Linking Documents to Encyclopedic Knowledge", Proceedings of the 16th ACM Conference on Information and Knowledge Management, Nov. 6-8, 2007, pp. 233-241.

Milne et al., "Learning to Link with Wikipedia", Proceedings of the 17th ACM Conference on Information and Knowledge Management, Oct. 26-30, 2008, pp. 509-518.

Nigam et al., "Text Classification from Labeled and Unlabeled Documents using EM", Machine Learning, vol. 39, 2000, pp. 103-134.

Orr et al., "Learning from Big Data: 40 Million Entities in Context", available online <https://research.googleblog.com/2013/03/learning-from-big-data-40-million.html>, Mar. 8, 2013, 6 pages.

Ratinov et al., "Local and Global Algorithms for Disambiguation to Wikipedia", Proceedings of the 49th Annual Meeting of the Association for Computational Linguistics, Jun. 19-24, 2011, pp. 1375-1384.

Sil et al., "Linking Named Entities to Any Database", Proceedings of Joint Conference on Empirical Methods in Natural Language Processing and Computational Natural Language Learning, Jul. 12-14, 2012, pp. 116-127.

Subramanya et al., "Semi-Supervised Learning with Measure Propagation", Journal of Machine Learning Research, vol. 12, 2011, pp. 3311-3370.

Talukdar et al., "Experiments in Graph-based Semi-Supervised Learning Methods for Class-Instance Acquisition", Proceedings of the 48th Annual Meeting of the Association for Computational Linguistics, Jul. 11-16, 2010, pp. 1473-1481.

Talukdar et al., "New Regularized Algorithms for Transductive Learning", Proceedings of the European Conference on Machine Learning and Knowledge Discovery in Databases: Part II, 2009, pp. 442-457.

Talukdar et al., "Weakly-Supervised Acquisition of Labeled Class Instances using Graph Random Walks", Proceedings of Conference on Empirical Methods in Natural Language Processing, Oct. 2008, pp. 582-590.

* cited by examiner

ADDITIVE CONTEXT MODEL FOR ENTITY RESOLUTION

RELATED APPLICATIONS

This application claims priority under 35 U.S.C. §119 to Provisional Patent Application Ser. No. 61/915,356, entitled "AN ADDITIVE CONTEXT MODEL FOR ENTITY RESOLUTION" filed on Dec. 12, 2013. The subject matter of this earlier filed application is hereby incorporated by reference.

BACKGROUND

Large data graphs store data and rules that describe knowledge about the data in a form that provides for deductive reasoning. Data graphs often store entities, such as people, places, things, concepts, etc., as nodes. Relationships between entities may be the edges between nodes. The relationships and entities in the data graph can represent facts. For example, the entities "Maryland" and "United States" may be linked by the edges of "in country" and/or "has state." Identifying entities mentioned in text is a key step in many language-processing tasks, such as text classification, information extraction, and grounded semantic extraction. It may also assist tasks such as part-of-speech tagging, parsing, and coreference resolution. But entity resolution can be challenging because the same text may refer to multiple entities. For example, Newcastle may refer to Newcastle upon Tyne, UK, to the football (soccer) club Newcastle United, or to the beverage Newcastle Brown Ale. Context may assist in disambiguating the referring text. For example, if the referring text includes the context of "John plays for Newcastle," the mention is most likely the football club, while "John was born in Newcastle" most likely refers to the location, etc.

Models are often used in entity resolution. Models predict the probability of some event given observations. Machine learning algorithms can be used to train the parameters of the model. For example the model may store a set of features and a support score for each of a plurality of different entities. The support score represents a probability score the model has learned, a probability that the feature occurs given the entity. Models used in entity resolution have relied on three components: a mention model, a context model, and a coherency model. The mention model represents the prior belief that a particular phrase refers to a particular entity in the data graph. The context model infers the most likely entity for a mention given the textual context of the mention. In a context model, each feature can represent a phrase that is part of the context for the entity mention. For example, the phrase "president" may have a support score (or a probability score) for the entities of "Barack Obama," "Bill Clinton," "Nicolas Sarkozy," and many others. Similarly, the phrase "plays for" may have a support score for various bands, teams, etc. The context discussed above may be represented by a set of features, or phrases, co-occurring with (e.g., occurring around) the referring text, or entity mention. The coherency model attempts to force all the referring expressions in a document to resolve to entities that are related to each other in the data graph. But a coherency model introduces dependencies between the resolutions of all the mentions in a document and requires that the relevant entity relationships in the data graph be available at inference time, increasing inference and model access costs.

SUMMARY

Some implementations provide for entity resolution using a model that combines contextual support scores additively to reduce overconfidence from correlated features in a machine learned model. For example, a system may determine the support scores for the entity mention given a particular set of features and calculate an average of the support scores. If the average of the support scores does not meet a threshold, the system may indicate that the entity mention could not be resolved to an existing entity. The additive model is a parametric model that can supplement labeled training data with a large unlabeled text corpus to achieve a model with better accuracy. For example, the system may use labeled data to train the model and then use the model to label additional unlabeled data. Using the now-labeled, previously unlabeled data, the system can re-estimate the parameters of the model to determine if training is complete. If the re-estimated parameters converge with the model parameters, training is complete. Otherwise, the system may alternate training the model using the labeled and now-labeled, previously unlabeled data until convergence. Because the additional training may generate a large model, inference for the learned resolution model can be distributed across many servers by entity.

In one aspect, a computer system includes at least one processor, and memory storing a graph-structured knowledge base of entities connected by relationships and instructions that, when executed by the at least one processor, causes the computer system to perform operations. The operations can include receiving a span of text from a document and a quantity of phrases from the document for the span, the phrases representing a context for the span and determining that the span refers to a quantity of candidate entities from the knowledge base. The method may also include, for each candidate entity, providing the entity and the phrases as input to an additive context model, the context model having been trained to provide a support score for an entity-phrase pair, receiving one or more support scores from the additive context model for the entity, computing a first probability for the entity by adding the support scores together and dividing by the quantity of phrases, the first probability representing a likelihood that the context resolves to the entity, receiving a second probability representing a likelihood that the span resolves to the entity regardless of context, and computing a third probability for the entity by combining the first probability with the second probability. The method may also include resolving the span to a candidate entity that has a highest third probability. In some implementations, a phrase in the quantity of phrases is a noun phrase from the document. In some implementations, the document is the text of a query.

These and other aspects can include one or more of the following features. For example, the computer system may comprise a plurality of entity servers and the context model may be partitioned across the entity servers based on entity. In such an implementation, the operations may also include receiving a plurality of spans from the document, each span being associated with a respective context, determining entity servers associated with candidate entities for each of the spans, sending respective requests to the determined entity servers, each request causing a recipient entity server to provide input to its portion of the additive context model and compute the first probability based on support scores provided by the model, and receiving the first probabilities from the entity servers. As another example, the operations may include training the additive context model using labeled data, using the trained additive context model on unlabeled data, resulting in labeling the unlabeled data, wherein each label assigned by the additive context model has an associated confidence score, and using data associated with labels having confidence scores that meet a threshold to re-train the context model. In such an implementation, training the context model may include repeating using the trained context model on unlabeled data and re-training the context model until convergence.

In another example, when the highest third probability does not meet a confidence threshold, the instructions include instructions that, when executed by the at least one processor, cause the system to resolve the span to an entity representing entities unknown to the knowledge base.

In another aspect, a computer-implemented method includes receiving a span of text from a document, receiving a phrase vector for the span, the phrase vector having a quantity of features and representing a context for the span, and determining, using at least one silicone-based hardware processor, a quantity of candidate entities from a knowledge base that have been referred to by the span. For each of the quantity of candidate entities the method may include determining, using the at least one silicone-based hardware processor, a support score for the candidate entity for each feature in the phrase vector, combining, using the at least one silicone-based hardware processor, the support scores additively, and computing, using the combined support score, a probability that the span resolves to the candidate entity given the context. The method may also include resolving the span to a candidate entity with a highest probability. In some implementations, the combining is done by multiplication.

These and other aspects can include one or more of the following features. For example, when the highest probability does not meet a confidence threshold, the method may include resolving the span to an entity representing entities unknown to the knowledge base. As another example, the resolving may be performed without a full coherency model. In some implementations, the features of the phrase vector can include noun phrases from the document and phrases coreferential with the span of text. As another example, combining the support scores additively can include computing a sum of the support scores for the candidate entity and dividing the sum by the quantity of features. In some implementations, the support score is stored in a context model that is partitioned across a plurality of entity servers, the partitioning being based on entity.

As another example, the probability is a first probability and the method can further include, for each candidate entity, combining the first probability with a second probability, the second probability representing a prior belief that the span refers to the candidate entity. In such an implementation, the resolving may include resolving the span to the candidate entity with a highest combined probability. In some implementations, the combining and calculating is performed according to the equation $$q_{m,e} = \frac{\sum_k b_{m,k} r_{k,e}}{\sum_k b_{m,k}},$$

which determines the probability q for a particular candidate entity e and a phrase vector b of features k for mention m.

In another aspect, a computer system includes at least one processor formed in a substrate and memory storing instructions that, when executed by the at least one processor, cause the computer system to perform operations. The operations may include providing labeled data to an additive context model for training, the additive context model inferring a most likely entity for a mention given a context of the mention. The additive context model may store, for each feature, at least one support score-entity pair. The operations may also include generating labels for unlabeled data using the trained model, the unlabeled data comprising entity mentions with respective phrase vectors, and where each label generated by the additive context model was based on additively combining support scores, and re-training the model using the generated labels for the unlabeled data and the labeled data.

These and other aspects can include one or more of the following features. For example, the operations may also include re-estimating the support scores of the context model after generating the labels, determining whether the re-estimated support scores converge with the support scores of the model, and performing the re-training and repeat generating the labels when the re-estimated support scores do not converge with the support scores of the model. In such an implementation, re-estimating the support scores of the context model after iteration u may be performed according to the equation $$r_{f,e}^{(u)} = \frac{\sum_{i \in L \cup U} b_{i,f} q_{i,e}^{(u)}}{\sum_{i \in L \cup U} b_{i,f}},$$

where r is the support score of feature f for entity e, i is the entity mention from the set of labeled data L and the set of unlabeled data U, b is the phrase vector for mention i and q is a context posterior from generating the labels in iteration u.

As another example, each generated label may have an associated confidence score and the operations may include using generated labels that meet a confidence threshold to re-train the model.

In another aspect, a non-transitory computer-readable medium may include instructions executable by at least one processor that cause a computer system to perform one or more of the methods described above.

One or more of the implementations of the subject matter described herein can be implemented so as to realize one or more of the following advantages. As one example, the method improves entity resolution without a full coherency component. Rather than using a coherency model, an implementation using an additive contextual model can cluster mentions in a document using a simple coreference algorithm and resolve each cluster independently of the resolution of the other clusters, saving time and processing costs.

Another advantage is that additive context models can expand the model using semi-supervised training. The expanded model increases accuracy of entity disambiguation, rather than negating the use of the context component, as has been observed with multiplicative context models. The feature correlations of the multiplicative context models produce bad results in a semi-supervised setting, reducing or eliminating the possibility of such a method of expanding a multiplicative model. The additive context model can be used for any problem with context features are correlated rather than independent. The model is also distributable, allowing the model to scale up to billions of entities.

The details of one or more implementations are set forth in the accompanying drawings and the description below.

Other features will be apparent from the description and drawings, and from the claims.

BRIEF DESCRIPTION OF DRAWINGS

Like reference symbols in the various drawings indicate like elements.

DETAILED DESCRIPTION

Figure 1:
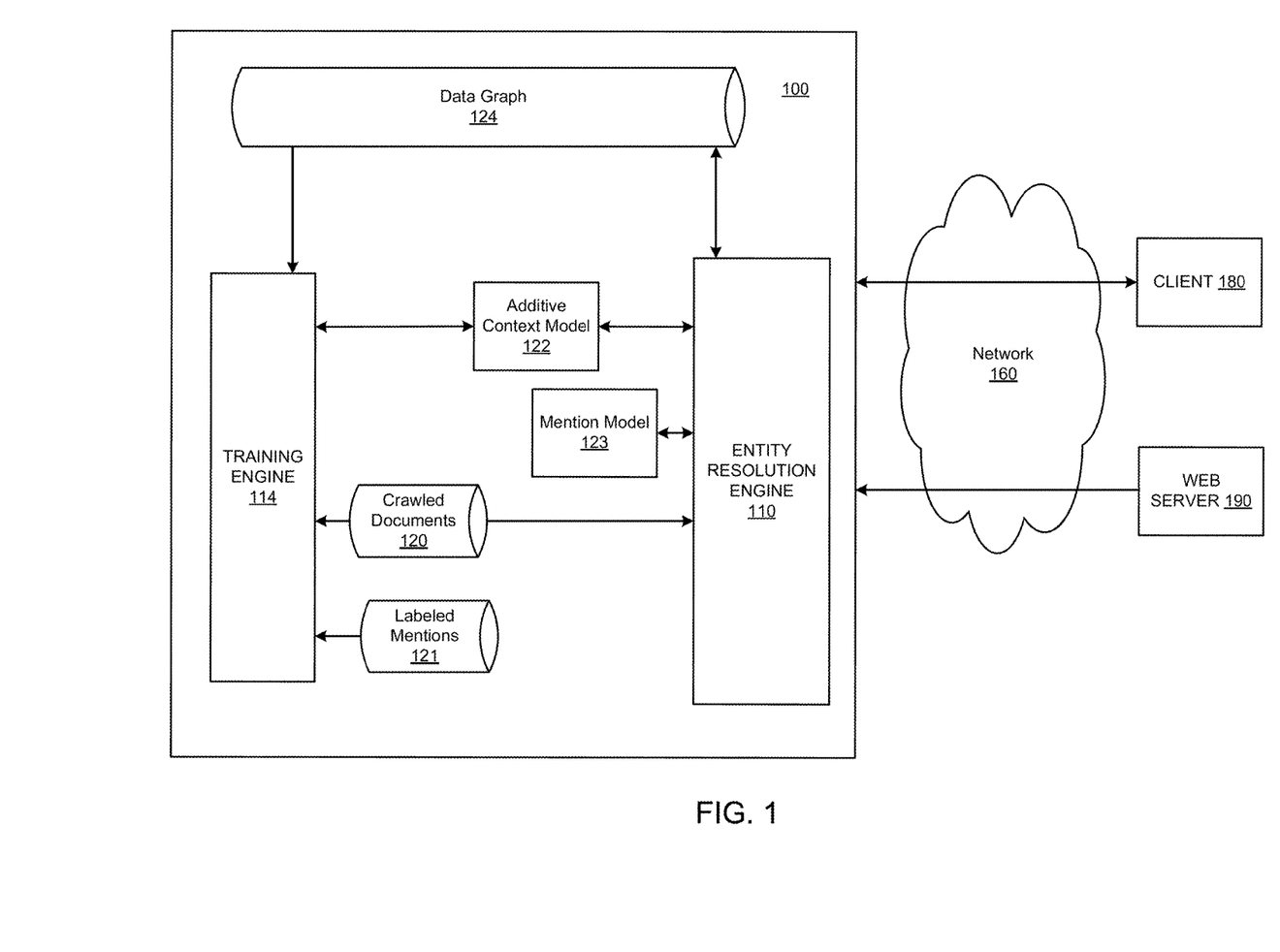
FIG. 1 illustrates an example system in accordance with the disclosed subject matter.

FIG. 1 is a block diagram of an entity disambiguation system in accordance with an example implementation. The system 100 may be used to disambiguate entity mentions in text using an additive context model. The system 100 may also be used to train an additive context model using semi-supervised learning, greatly enhancing the accuracy of the context model. In some implementations, the system 100 can disambiguate entity mentions in web pages, queries, email, posts on a social network, or any other document with text. A document is any associated text, whether short, like a query or email, or longer, like a PDF or web page. While system 100 in FIG. 1 is described as a system for disambiguating documents, other configurations and applications may be used. For example, the system may be used in any circumstance where context features can be correlated rather than independent.

Figure 6:
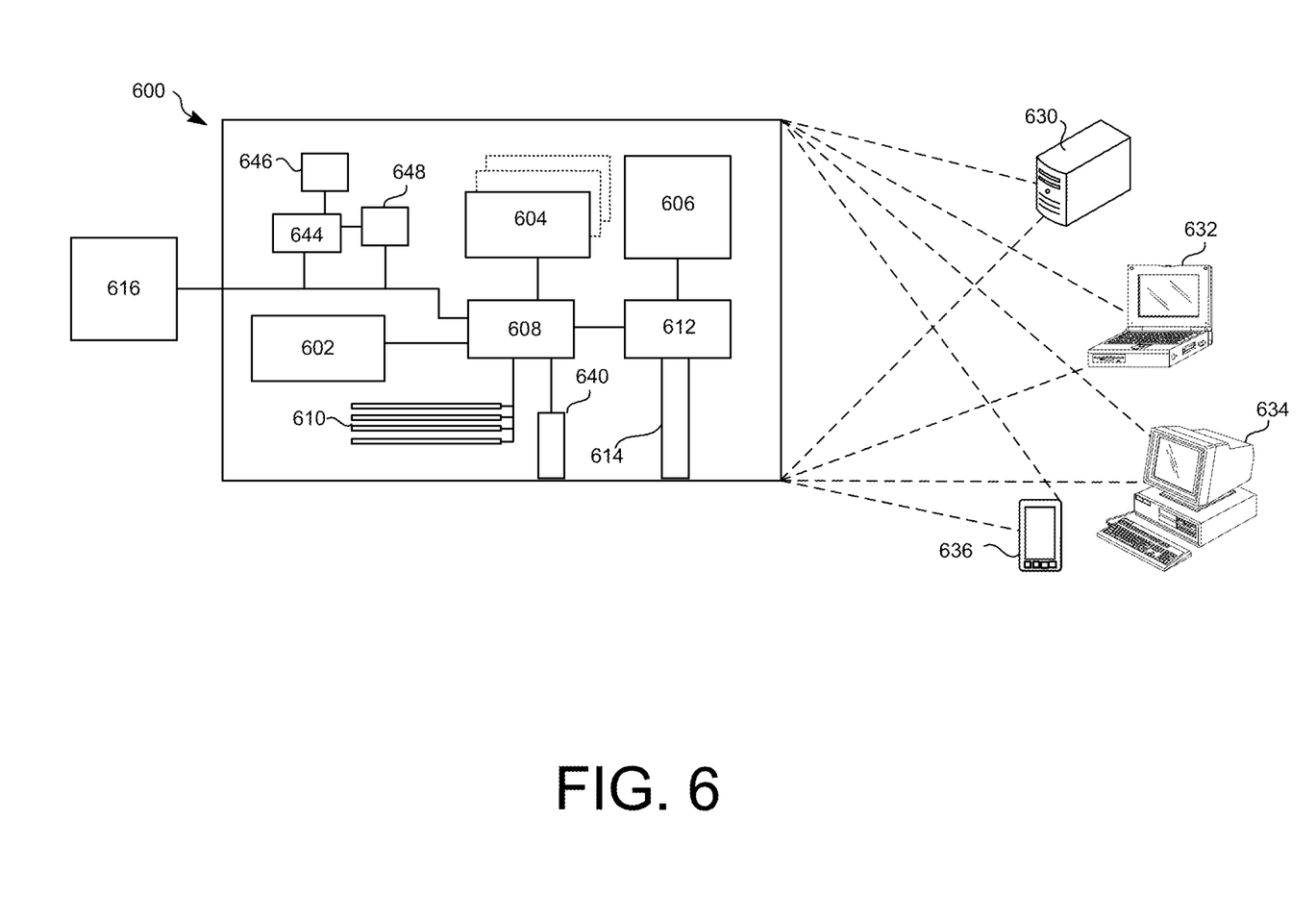
FIG. 6 shows an example of a computer device that can be used to implement the described techniques.
Figure 7:
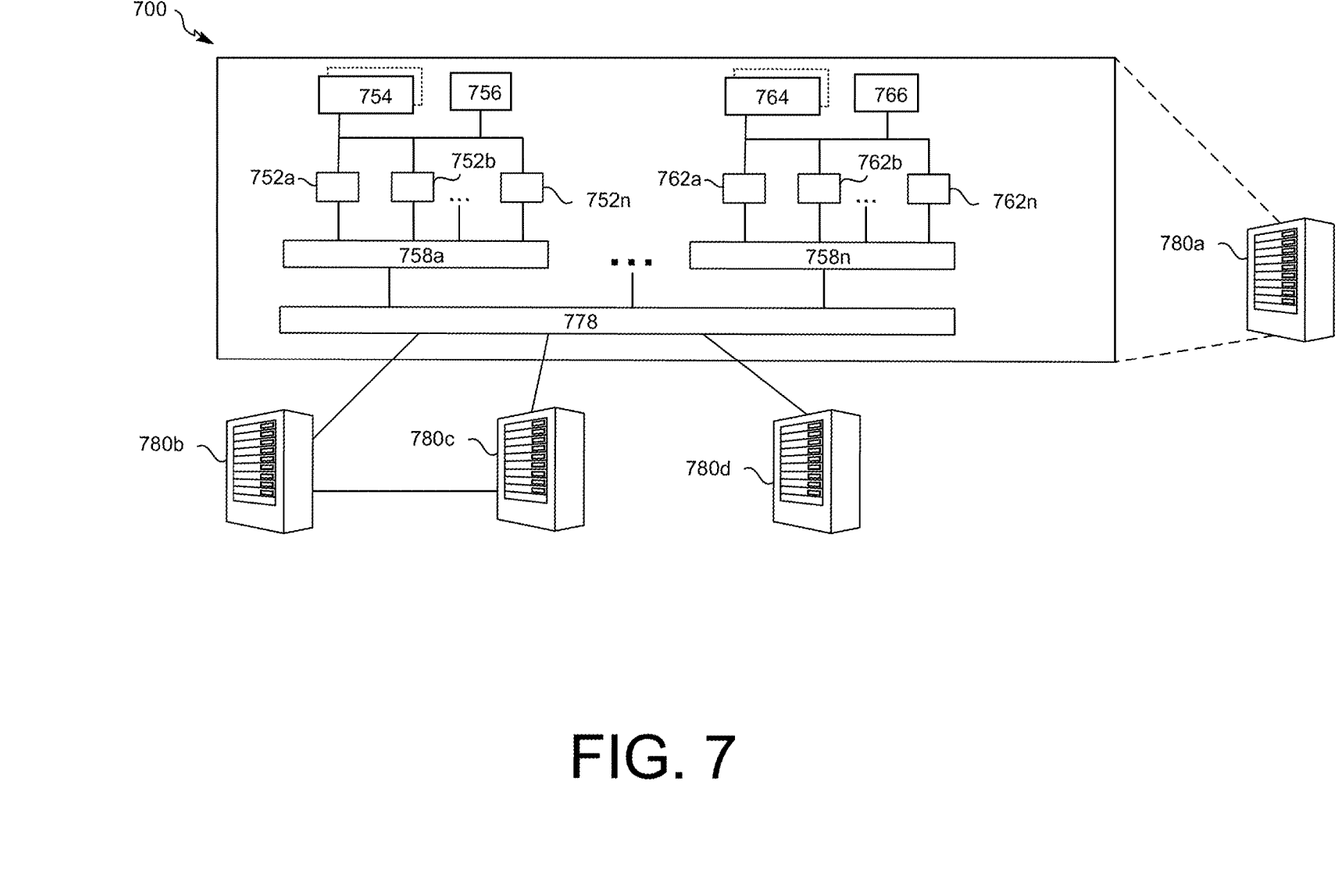
FIG. 7 shows an example of a distributed computer device that can be used to implement the described techniques.

The entity disambiguation system 100 may be a computing device or devices that take the form of a number of different devices. For example the system 100 may be a standard server, a group of such servers, a client-server system, or a rack server system. In addition, system 100 may be implemented in a personal computer, for example a laptop computer. The entity disambiguation system 100 may be an example of computer device 600, as depicted in FIG. 6, or computer device 700, as depicted in FIG. 7.

The entity disambiguation system 100 may include a data graph 124. The data graph 124 can be a directed edge-labeled graph. Such a data graph stores nodes and edges. The nodes in the data graph represent an entity, such as a person, place, item, idea, topic, abstract concept, concrete element, other suitable thing, or any combination of these. Entities in the data graph may be related to each other by edges, which represent relationships between entities. For example, the data graph may have an entity that corresponds to the musician George Harrison and the data graph may have an albums relationship between the George Harrison entity and entities representing albums that George Harrison has released. A data graph with a large number of entities and even a limited number of relationships may have billions of connections. In some implementations, data graph 124 may be stored in an external storage device accessible from system 100. In some implementations, the data graph 124 may be distributed across multiple storage devices and/or multiple computing devices, for example multiple servers.

Although not shown in FIG. 1, the entity disambiguation system 100 can include one or more processors (e.g., silicon-based hardware processors) configured to execute one or more machine executable instructions or pieces of software, firmware, or a combination thereof. The entity disambiguation system 100 can also include an operating system and one or more computer memories, for example, a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules that, when executed by the one or more processors, perform certain operations. In some implementations, the modules may be stored in an external storage device and loaded into the memory of system 100.

The modules may include an entity resolution engine 110 and a training engine 114. The entity resolution engine 110 may use an additive context model 122 and a mention model 123 to disambiguate an entity mention in a document. In one implementation, the entity resolution engine 110 may disambiguate documents from crawled document sources, such as crawled documents 120. Such disambiguated entities may be used, for example, to automatically generate new entities and/or new edges between entities in the data graph 124, to add mark-up to the crawled document to relate the entities in the document to an entity in the data graph 124, to refine a search result generated from the crawled documents 120, etc. The crawled documents 120 may be documents obtained using known or later developed web-crawling techniques, for example. In some implementations, the crawled documents 120 represent documents available over the Internet. For example, the crawled documents 120 may be indexed in an index used by a document search engine. The additive context model 122 may include a machine learning module that infers the most likely entity given a context vector. In making the inference, the machine learning module may combine context support scores additively, as will be explained in more detail below. The additive context model 122 may also include a model of features that each have associated entity support scores. A feature represents a context phrase and each feature may have one or more associated support scores. A phrase may be any portion of text from the document. For example, phrases may be other entity mentions (e.g., topical noun phrases) from anywhere in the document, phrases found to be coreferential with an entity mention, words in a sentence that includes the entity mention, etc.

Each support score may represent a vote for a particular entity given the feature. In other words, the support score represents a probability of the particular entity occurring given the context phrase (the feature). Each feature can have support scores for multiple entities, e.g., a number of entities that are possible given the context. For example, the feature "President" may have a support score for the entity Barack Obama as well as the entities Bill Clinton, Ronald Reagan, Abraham Lincoln, Nicolas Sarkozy, etc. If a feature does not have a support score for a particular entity, its vote may be considered zero for the entity.

In some implementations, the additive context model 122 may be distributed amongst a plurality of entity servers. For example, the feature of "President" may be distributed amongst two or more entity servers, so that a first entity server stores the support scores for Barack Obama and Nicolas Sarkozy, a second entity server stores the support score for Abraham Lincoln, and a third entity server stores the support scores for Ronald Reagan and Bill Clinton. In such an implementation, the system may include a client that stores a list mapping an entity to an entity server. Thus, the client knows that all features that have a support score for Barack Obama are on the first entity server, all the features that have a support score for Ronald Reagan are on the third entity server, etc. In some implementations, the entity assignment may be based on entity clusters. For example, entities with a similar text representation may be clustered together. For example, the musician George Harrison and the vice president of Nintendo George Harrison may both be assigned to the third entity server, for example. Of course, other entity clustering criteria may be used, such as a hash of the text or of an entity identifier, etc.

The entity resolution engine 110 may be based on a naïve Bayes resolution model with the assumption that a mention's phrase and its context are conditionally independent given the entity mentioned. This may be represented by the following equation:

$$p(E|W, C) \propto \frac{p(E|W)p(E|C)}{p(E)}$$

where E is the possible entity from the data graph, W is the text span representing the entity mention, and C is the context vector of the span of text (e.g. all the phrases that make up the context). In the equation above p(E) is the probability of the entity E occurring independent of the span of text or the context, p(E|W) is the probably of the span of text W referring to the entity E, and p(E|C) is the probability of the entity occurring given the context vector, regardless of the span of text. p(E|W) may be provided by an entity mention model, such as model 123. p(E) may be provided to the entity resolution engine, for example, from statistics about the knowledge graph or estimated from other publicly available knowledge sources, such as WIKIPEDIA or FREEBASE. In some implementations, p(E) may be determined by marginalizing out W from p(E,W). A context model may provide p(E|C). This probability may be referred to as the contextual posterior for an entity E. In an additive context model, the probability may be referred to as an additive contextual posterior.

The additive context model 122 may provide support scores in a vector $r_k \in \Delta \epsilon$ that represent scores for candidate entities from the data graph given the observed feature k. In the additive context model, $r_{k,j}$ is the vote for entity j by feature k. Thus, $r_{k,j}$ is a support score for feature k. Given the model parameters (e.g., $r_k$), the contextual posterior probability vector over entities may be computed for each mention i, written as $q_i \in \Delta \epsilon$. The contextual posterior $q_{i,j}$ is the probability that mention i resolves to entity j given just i's textual context. The r and q parameters may be linked with the joint loss function:

$$L(r, q) = \sum_i \sum_k b_{i,k} \sum_j (q_{i,j} - r_{k,j})^2$$

where $b_{i,k}$ is the phrase vector (e.g. the features that represent the context of the mention i). The loss measures the disagreement between the fractional assignment of entities to mentions as given by q and the sum of the votes r for the same entities from the context features for the same mentions. As is explained in further herein, to derive the contribution of the mention context when inferring the mentioned entity, the system may solve for the minimum loss with respect to q. To re-estimate the model parameters when training the model, the system may solve for the minimum with respect to r.

The modules of system 100 may also include training engine 114. In some implementations, the training engine 114 may be configured to use semi-supervised learning to train and expand the additive context model 122. For example, the training engine 114 may use labeled mentions 121 as positive examples of features that co-occur with particular entities. The labeled mentions 121 may represent spans of text that are entity mentions labeled with respective entities from the data graph 124 that the span refers to. The labeled mentions 121 may also include phrases representing context features for the entity. Such labeled mentions are positive examples, allowing the model to infer the support scores for the features that occur with respective entities. The labeled mentions 121 may also include negative examples, e.g., entity mentions that allow the model to infer what context phrases does not occur with an entity. In a training mode, the machine learning module of additive context model 122 uses the labeled mentions 121 to generate the features and the corresponding support scores of the model 122.

The number of labeled mentions 121 is generally limited, either because it is generated manually or because documents that can be used to generate automatically labeled mentions are limited. However, the training engine 114 may use semi-supervised learning to expand the model 122. For example, after the model 122 has been trained with labeled mentions 121, the training engine 114 may run unlabeled mentions through the model, with the model 122 providing labels for the unlabeled data. The labels provided by the model, if provided with sufficient confidence, can be used as labeled mentions to train the model. This may continue (training followed by application of the trained model) until convergence in the model parameters (e.g., the support scores), as discussed in more detail below with regard to FIG. 5.

In some implementations, the modules may also include a search engine (not shown). The search engine may receive queries, identify an entity mention in the query, and use the entity resolution engine 110 to disambiguate the entity mention in the query, if needed. Using the disambiguated entity mention the search engine may generate a search result from the data graph 124 and/or from crawled documents 120. As another example, the search engine may determine crawled documents 120 that are responsive to a query and use entity mentions in the responsive documents to generate a search result. For example, the search engine may examine responsive documents for entity mentions, use the entity resolution engine 110 for disambiguation if needed, and use the entity mentions to generate snippets, to re-rank the results, etc. In some implementations, the search engine may provide the search result to another search engine or other module for combination with search results from other sources.

Entity disambiguation system 100 may be in communication with client(s) 180 over network 160. Clients 180 may allow a user to monitor and direct the training of the additive context model 122, to submit queries to a search engine that uses entity resolution engine 110, or to verify and analyze entity mentions inferred by the entity resolution engine 110. Network 160 may be, for example, the Internet, or the network 160 can be a wired or wireless local area network (LAN), wide area network (WAN), etc., implemented using, for example, gateway devices, bridges, switches, and/or so forth. Via the network 160, the entity disambiguation system 100 may communicate with and transmit data to/from clients 180. In some implementations, entity disambiguation system 100 may be in communication with or include other computing devices that provide updates to the data graph 124 and/or to the crawled documents 120. For example, entity disambiguation system 100 may include or be in communication with an indexing engine that crawls web server(s) 190 for documents and indexes the contents of the documents. The entity disambiguation system 100 represents one example configuration and implementations may incorporate other configurations. For example, some implementations may combine one or more of the entity resolution engine 110, the training engine 114, and a search engine into a single module or engine. As another example, elements of the training engine 114 and the entity resolution engine 110 may be distributed across different computing devices. For example, the elements of the entity resolution engine 110 may be distributed across a client computing device and one or more entity servers that store the additive context model 122.

Figure 2:
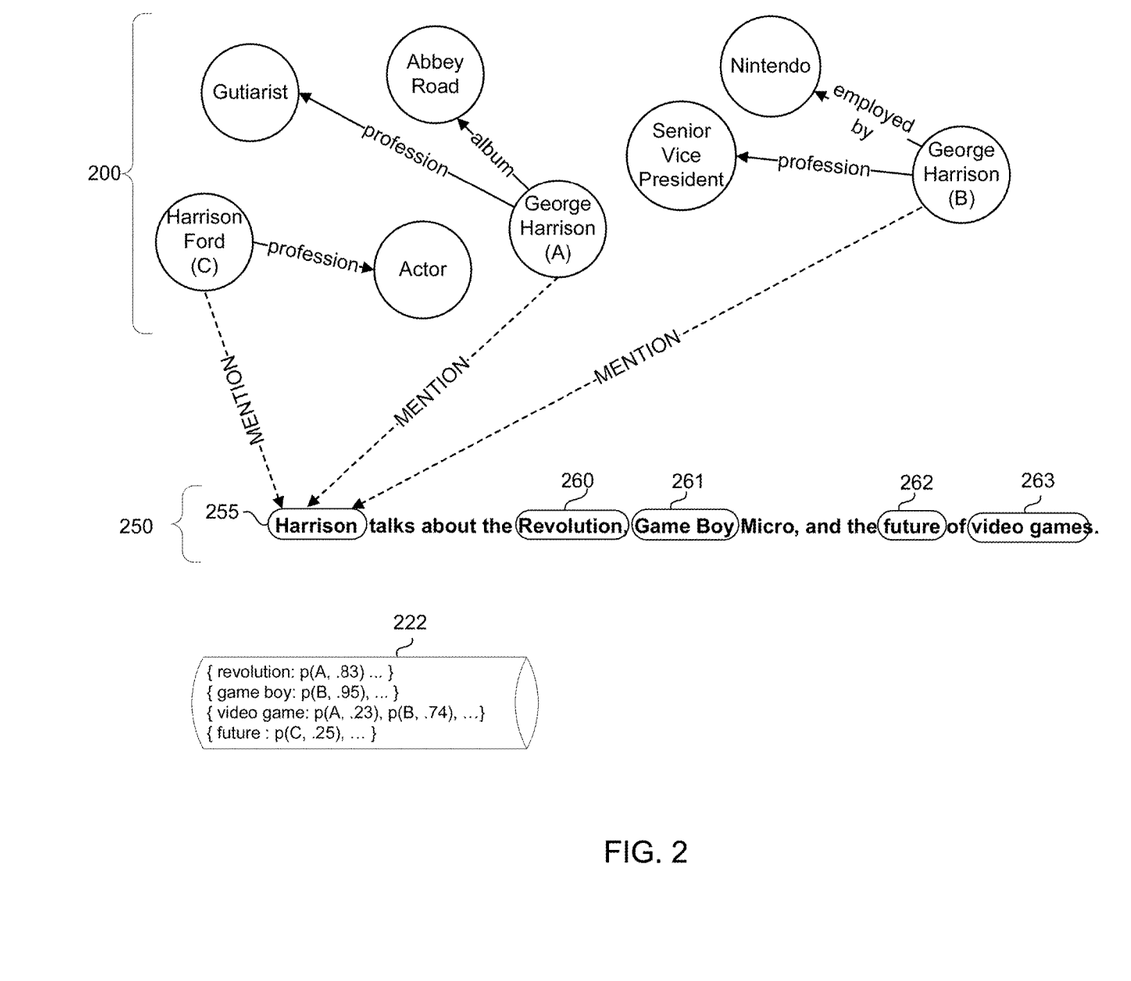
FIG. 2 illustrates an example of entities and relationships in a data graph and text with an ambiguous entity mention.

FIG. 2 illustrates an example of entities and relationships in a data graph and text with an entity mention and context phrases. FIG. 2 also illustrates an example additive context model 222. Of course, the example data graph 200 illustrates only a few entities and relationships for the sake of brevity and it is understood that the data graph may include millions of entities and relationships. The text 250 may be text from a document that is parsed into the text span 255 that represents an entity mention and context phrases 260, 261, 262, and 263. The parsing of the text can be accomplished using known or later developed semantic-syntactic techniques. The result of the parsing may be, the span 255 of text 250 that represents an entity mention, but the mention resolves to more than one entity in the data graph, as illustrated. Thus, the text span 255 is in need of disambiguation. The parsing may also result in a phrase vector for the text span 255. The context of a mention is abstracted as a multiset of features that may include phrases related to the mention by linear order, syntax, or within-document coreference; salient phrases for the whole enclosing document, and other properties of the mention and enclosing document; and other properties of the mention and enclosing document. The multiset may be referred to as a phrase vector, and represented as $c_{i,k}$, where i represents the mention (e.g., 255), and k indexes over the features (e.g., 260, 261, 262, and 263).

FIG. 2 also illustrates example features and support scores of a context model 222. In the example of FIG. 2, the context model 222 includes four features, e.g., 'revolution', 'game boy', 'video game', and 'future'. The features have an associated list of support scores. The support score represents a probability for a particular entity or a magnitude of support that feature gives the entity. Thus, in the example of FIG. 2, the 'revolution' feature has a support score of 0.83 for the George Harrison entity (entity A) in the data graph 200. Likewise, the 'video game' feature has a support score of 0.23 for entity A in the data graph 200 and a support score of 0.74 for the George Harrison entity (entity B) in the data graph 200. This means that it is more likely that the SVP George Harrison occurs with the terms "video game" than the musician George Harrison. It is understood that the context model 222 of FIG. 2 is illustrated only with four features and a few associated support scores for the sake of explanation and brevity.

Figure 3:
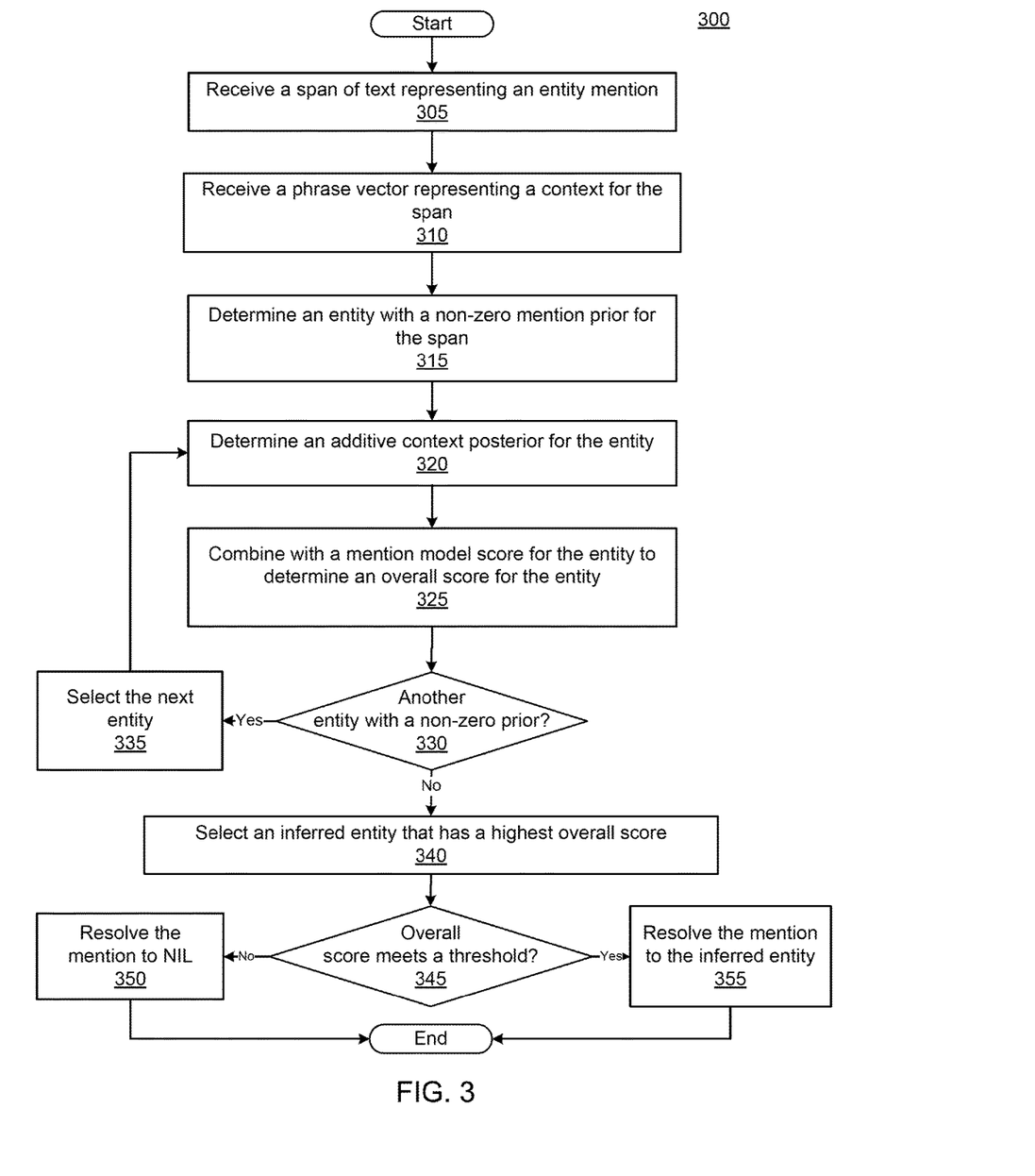
FIG. 3 illustrates a flow diagram of an example process for entity disambiguation using an additive context model, in accordance with an implementation.

FIG. 3 illustrates a flow diagram of an example process 300 for entity disambiguation using an additive context model, in accordance with an implementation. Process 300 may be performed by an entity disambiguation system, such as system 100 of FIG. 1. Before process 300 may begin, the system may train an additive context model to create context features with associated entity support scores. In some implementations, the training may be the semi-supervised learning described below with regard to FIG. 5. The features and associated support scores may be stored in an additive context model and used in process 300 to disambiguate entities. Training of the additive context model must occur at least once before entity resolution can occur. Once the model is established, the system may use the model to disambiguate entities in text of documents.

Process 300 may begin when the entity resolution engine receives a span of text representing an entity mention (305). The entity resolution engine may also receive a phrase vector representing the context for the span (310). In some implementations, the system may use two types of context features. The first type includes the phrases that a within-document coreference system has determined to be coreferential with the mention. The second type includes all other mention phrases in the document (e.g., other entity mentions). These context features may be treated as a set of features for the mention. For example, the span of text may be represented by $w_m$ and the context may be represented as a phrase vector $b_m$ of features $b_{m,k}$, where k indexes over the features for mention m. From the span of text $w_m$, the entity resolution engine may determine an entity from the data graph that has a non-zero mention prior for the span (315). The non-zero mention prior may be determined from a mention model, such as model 123 of FIG. 1, and may be referred to as a mention model score. The mention model score represents the probability that the entity mention (e.g., the span of text) refers to the entity. The system may use an annotated corpus, for example WIKIPEDIA pages, to determine the mention model score. Given the annotated corpus, the system may compute the probability that the mention refers to the entity by counting the number of times the phrase is used to refer to an entity. For example, for each WIKIPEDIA page that represents an entity, anchors of links to the page and their counts may be used to estimate a mention model. Of course, any method of generating a mention model can be used.

Figure 4:
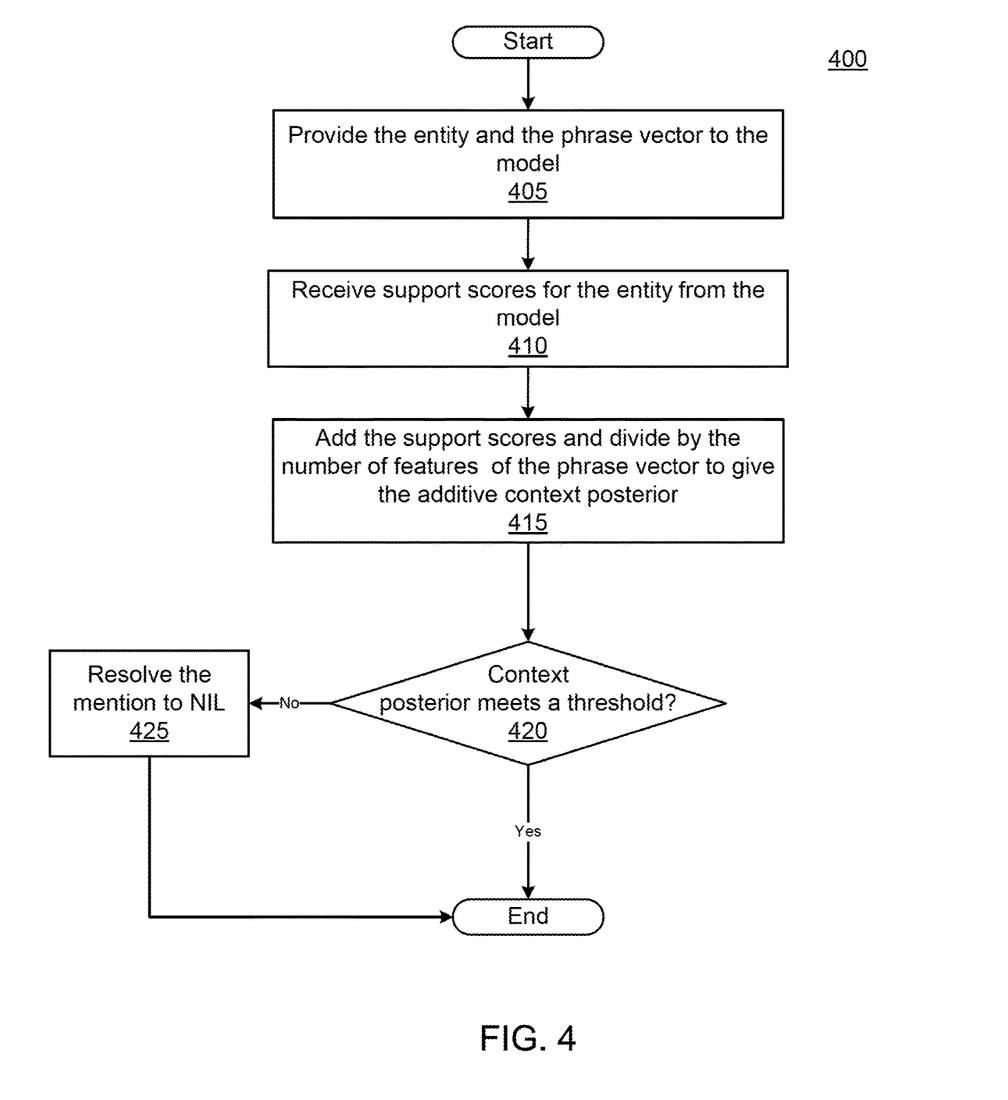
FIG. 4 illustrates a flow diagram of an example process for determining an additive context posterior, in accordance with an implementation.

The entity resolution engine may determine an additive context posterior for the entity (320). The context posterior represents the probability that the entity mention m resolves to the entity given just the context of the mention (e.g., the phrase vector $b_m$). In an additive context model, the context posterior is an additive context posterior. In some implementations, the additive context posterior for a mention m and entity e and a phrase vector $b_{m,k}$ can be represented by the formula $$q_{m,e} = \frac{\sum_k b_{m,k} r_{k,e}}{\sum_k b_{m,k}}$$

where $r_{k,e}$ represent the support scores of feature k for entity e. Determining an additive context posterior by additively combining context evidence is also described herein, e.g., with regard to FIG. 4. The entity disambiguation engine may combine the additive context posterior for the entity with the mention model score (325). The mention model score may be the non-zero mention prior for the entity. In some implementations the entity disambiguation engine may multiply the mention model score with the additive context posterior. The combined score is an overall score for the entity. In some implementations, the overall score may also account for the probability of the entity E occurring independent of the span of text or the context, e.g., p(E). For example, the entity disambiguation engine may divide the product of the mention model score and the additive context posterior by p(E) to determine the overall score.

If there is another entity with a non-zero mention prior (e.g., from a mention model) (330, Yes), the system may select the next entity (335) and use the additive context model to calculate the context posterior for this entity and determine an overall score for this entity. When all entities with a non-zero prior have been examined (330, No), the entity resolution engine may determine which entity has the highest overall score and consider that entity to be the inferred entity (340). However, if the overall score for that entity does not meet a confidence threshold, the system may reject the inferred entity. In some implementations the confidence threshold may be a minimum difference between the highest overall score and the second-highest overall score. Accordingly, the system may determine whether the overall score meets a confidence threshold (345). If it does not (345, No), the system may determine that the entity referred to by the span is not in the data graph, or at least that there is not enough evidence to link it to an entity in the data graph. Accordingly, the system may resolve the entity to NIL, or some other value or entity that represents all entities unknown to the mention model or unknown to the data graph. In some implementations the confidence threshold may be tuned on a development set of data. If the overall score does meet the confidence threshold (345, Yes), the system may resolve the mention to the inferred entity (355). In some implementations, this may be done by linking the inferred entity to the text span. Process 300 then ends, with the entity resolution engine having resolved the entity mention to an entity in the data graph using an additive context model.

In some implementations with a distributed additive context model, the system may perform steps 320 and 325 in parallel for each entity. For example, assuming that the text span 255 of FIG. 2 is the entity mention and that a first entity server has support scores for the Harrison Ford entity (entity C), and a second entity server has support scores for the George Harrison entity (entity A) and the George Harrison entity (entity B), the system may perform steps 320 and 325 at the first entity server for entity C and at the second entity server for entities A and B. The entity servers may send back the overall scores of several different entities and a client may determine which entity has the highest score. In another implementation, the entity servers may only perform step 320 and may send back the context posterior for each entity it services. Of course, other arrangements are also possible.

FIG. 4 illustrates a flow diagram of an example process 400 for determining an additive context posterior, in accordance with an implementation. Process 400 may be performed by an entity disambiguation system, such as system 100 of FIG. 1, as part of step 320 of FIG. 3. Process 400 determines a context posterior additively rather than multiplicatively. For entity disambiguation, combining context evidence for an entity multiplicatively was surprisingly discovered to be only slightly better than just using the mention prior and, more surprisingly, a larger multiplicative context model was discovered to hurt the performance of the model. Thus, a multiplicative context model was found not to allow for entity resolution without a full coherency component and would not allow the model to grow with additional features. It was discovered that by assuming conditional feature independence, the multiplicative model's judgments were too extreme when correlated features appear simultaneously in the phrase vector. Combining context evidence additively instead of multiplicatively was found to reduce the combined influence of highly indicative but possibly highly correlated features. Because context in entity disambiguation often has correlated features, the additive combination of context evidence was found to improve entity resolution methods.

Process 400 may begin by providing the context model with an entity and a phrase vector (405). The phrase vector, as indicated above, represents the context features for the entity mention. The model may provide support scores for the entity (410). The support scores represent votes for the provided entity given the features. The system may add the support scores together and divide by the number of total features in the phrase vector (415). This average of support scores is the additive context posterior for the entity. In some implementations, the system may determine whether the additive context posterior meets a threshold (420). As an average of support scores, the context posterior represents a magnitude of support for the entity. If the magnitude of support is not high enough (420, No), the system may resolve the entity mention to an entity that represents all entities unknown to the data graph (425). Process 400 then ends, having generated an additive context posterior for the particular entity.

An example of the additive context model follows, using text 250 and model 222 of FIG. 2. In the example of FIG. 2, the system may be asked to disambiguate the text span 255 "Harrison," which represents an entity mention in the sentence "Harrison talks about the Revolution, Game Boy Micro, and the future of video games." As illustrated in FIG. 2, the text may have three non-zero mention priors from a mention model. For example, Harrison may refer to entity A, entity B, or entity C of the data graph 200. Entity A and Entity C may have a much higher mention prior, because the actor Harrison Ford and the musician George Harrison are more well known and thus, mentioned more often, in documents. Thus, the entity disambiguation system may use the additive context model to determine which of the three possible entities the text span 255 refers to.

The entity disambiguation system may also receive a phrase vector that includes phrases 260, 261, 262, and 263. In some implementations, these phrases may be chosen because they are also entity mentions. In some implementations, the phrase vector may also include phrases that a within-document coreference system has determined to be coreferential with 255. Each phrase is a context feature. In some implementations, the system may retrieve the support scores for each of the context features. For example, the system may select the four features illustrated in model 222. The system may select the support scores that vote for entity A. A feature that does not have a support score for an entity may be considered to have a vote of zero for the entity. Thus, the system may determine that the support scores for entity A (e.g., George Harrison the musician) are 0.83, 0, 0.23, and 0. The phrase "revolution" may be associated with entity A because of the song "Revolution" on the Beatles' White Album. The "video game" feature may be associated with entity A because of Beatles' songs associated with the Just Dance video games. The model may not have encountered the other features in a context with a mention of entity A before and, therefore, they do not vote for entity A.

The support scores for entity B (e.g., George Harrison the SVP) are 0, 0.95, 0.74, and 0. Although "Revolution" was the code name for the Wii® gaming system prior to its release, the context model may not have encountered this phrase with a mention for entity B before. Thus, the "revolution" feature may not have a vote for entity B. However, because entity B is an SVP at Nintendo, the features "game boy" and "video game" have likely been encountered before and have support scores for entity B. The support scores for entity C (e.g., Harrison Ford) are 0, 0, 0, 0.25. The system may use the support scores to calculate an additive context posterior for each entity. In the additive model, the context posterior is an average of the support scores. Thus, the context posterior for entity A is 0.265, the context posterior for entity B is 0.4225 and the context posterior for entity C is 0.0625. Because the context posterior for entity B is higher than the other two entities, the additive context model infers that the mention represented by text span 255 is for entity B. In some implementations, the context posterior may be provided to an entity resolution engine that combines the context posterior with the mention prior for the entity. In some implementations they may be multiplied. This may result in an overall score for the entity. The system may use the overall score to select the inferred entity. In some implementations, the inferred label of entity B form mention 255 may be used in semi-supervised training. For example, the label may be added to the text 250 and used as training data for the model. The training may result in the model adding a support score for the "revolution" feature for entity B, because the model has now encountered the phrase "revolution" in a context for an entity mention for entity B. A discussion of such semi-supervised learning follows.

Figure 5:
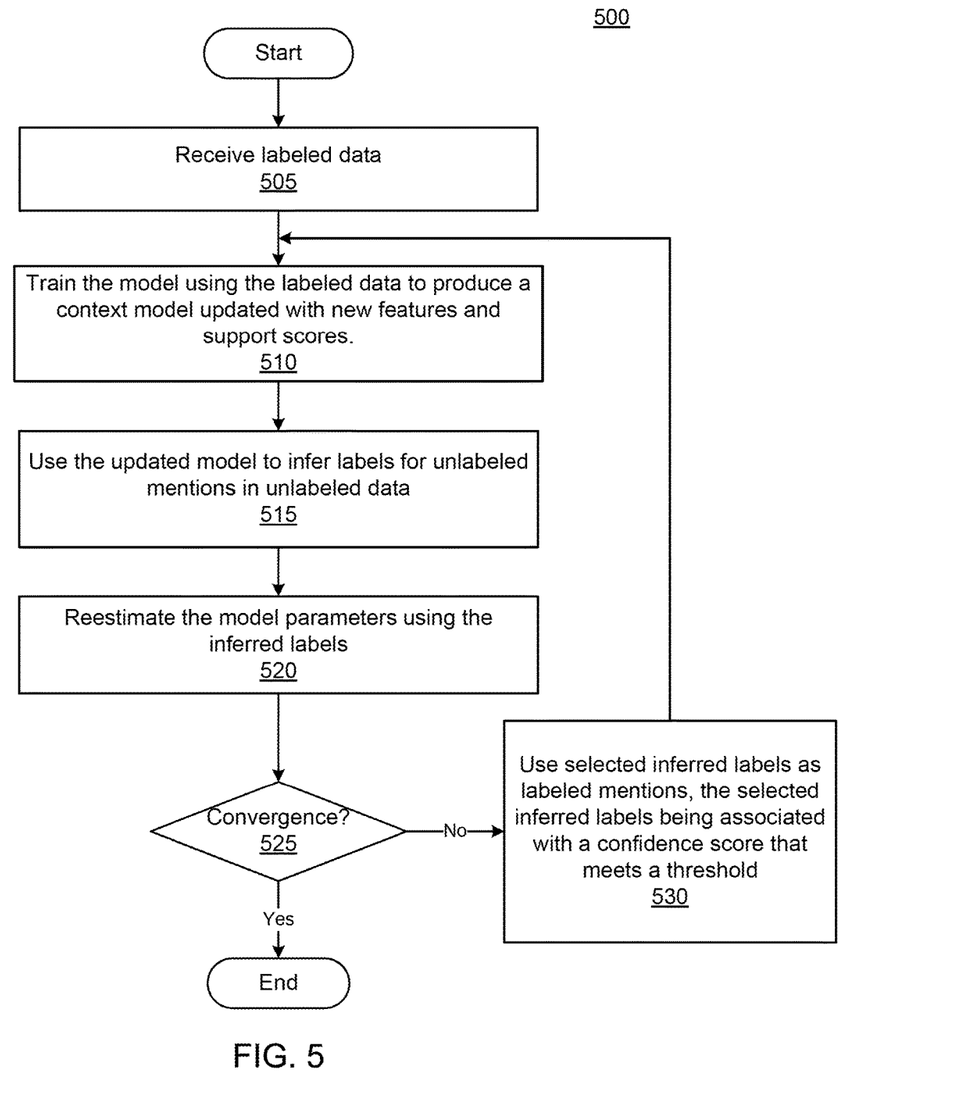
FIG. 5 illustrates a flow diagram of an example process for semi-supervised training of the model, according to an implementation.

FIG. 5 illustrates a flow diagram of an example process 500 for semi-supervised training of an additive context model, according to an implementation. Process 500 may be used by an entity resolution system, such as system 100 of FIG. 1, to train an additive context model and to expand the model. In semi-supervised learning, the model is provided a set of labeled mentions and a (typically much larger) set of unlabeled mentions. Each set has corresponding contexts, or phrase vectors. Given the set of labeled data, that includes labeled mentions and corresponding contexts (505), the system may provide the labeled mentions and corresponding contexts to the model for training (510). Training produces new support scores and new features for the model. Using the updated additive context model, the system may provide inferred labels for a set of unlabeled data and their corresponding contexts (515). The updated model thus provides inferred labels for the unlabeled mentions, using a process similar to process 300 of FIG. 3. Using the inferred labels, the system may re-estimate the parameters of the model (520). The parameters are the support scores, or in other words the vote of a feature for an entity. Given the labeled mentions and the inferred mentions (e.g., represented by the context posteriors $q_{m,e}$ for mention m and entity e), the system can estimate new support scores (e.g., $r_{f,e}$ is the vote of feature f for entity e) using the equation:

$$r_{f,e}^{(u)} = \frac{\sum_{i \in L \cup U} b_{i,f} q_{i,e}^{(u)}}{\sum_{i \in L \cup U} b_{i,f}}$$

where L is the set of labeled mentions and U is the set of unlabeled mentions, and u is the iteration index. If the re-estimated support scores do not converge with the support scores in the model (525, No), the system may use the inferred labels generated by the model as additional training data for the model (530). In some implementations, the system may only use inferred labels that meet a confidence threshold for further training. The confidence threshold is based on the context posterior and the overall score, for example the context posterior meeting a threshold and/or the overall score meeting a threshold. The system may then repeat the training with the labeled data and the selected inferred labels (510), and run the model on the unlabeled data again (515). The system may then re-estimate the support scores (520) to test for convergence. If the re-estimated support scores (e.g., $r_{f,e}$) converge with the parameters in the model (525, Yes), the iterations end and the semi-supervised learning is complete. Convergence may be based on a number of approaches. As one example, if the change in the estimated parameters between two iterations meets a threshold, the system may consider the support scores to converge.

The inferred labels can be used to re-estimate the support scores because the amount of labeled data is limited, so many contextual features are not observed in the labeled data. Furthermore, the distribution of words and phrases in the labeled data may be very different from the distributions encountered in disambiguation circumstances. This can be counteracted by choosing unlabeled data for semi-supervised learning that more closely matches the expected distribution to improve model performance.

FIG. 6 shows an example of a generic computer device 600, which may be operated as system 100, and/or client 170 of FIG. 1, which may be used with the techniques described here. Computing device 600 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 600 includes a processor 602, e.g., a silicone-based hardware processor, memory 604, a storage device 606, and expansion ports 610 connected via an interface 608. In some implementations, computing device 600 may include transceiver 646, communication interface 644, and a GPS (Global Positioning System) receiver module 648, among other components, connected via interface 608. Device 600 may communicate wirelessly through communication interface 644, which may include digital signal processing circuitry where necessary. Each of the components 602, 604, 606, 608, 610, 640, 644, 646, and 648 may be mounted on a common motherboard or in other manners as appropriate.

The processor 602 can process instructions for execution within the computing device 600, including instructions stored in the memory 604 or on the storage device 606 to display graphical information for a GUI on an external input/output device, such as display 616. Display 616 may be a monitor or a flat touchscreen display. In some implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk. In some implementations, the memory 604 may include expansion memory provided through an expansion interface.

The storage device 606 is capable of providing mass storage for the computing device 600. In one implementation, the storage device 606 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 604, the storage device 606, or memory on processor 602.

The interface 608 may be a high speed controller that manages bandwidth-intensive operations for the computing device 600 or a low speed controller that manages lower bandwidth-intensive operations, or a combination of such controllers. An external interface 640 may be provided so as to enable near area communication of device 600 with other devices. In some implementations, controller 608 may be coupled to storage device 606 and expansion port 614. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 630, or multiple times in a group of such servers. It may also be implemented as part of a rack server system. In addition, it may be implemented in a personal computer such as a laptop computer 622, or smart phone 636. An entire system may be made up of multiple computing devices 600 communicating with each other. Other configurations are possible.

FIG. 7 shows an example of a generic computer device 700, which may be system 100 of FIG. 1, which may be used with the techniques described here. Computing device 700 is intended to represent various example forms of large-scale data processing devices, such as servers, blade servers, datacenters, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 700 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780a includes multiple racks 758a-758n. Each rack may include one or more processors, such as processors 752a-752n and 762a-762n. The processors may include data processors, network attached storage devices, and other computer controlled devices. In some implementations, one processor may operate as a master processor and control the scheduling and data distribution tasks. Processors may be interconnected through one or more rack switches 758, and one or more racks may be connected through switch 778. Switch 778 may handle communications between multiple connected computing devices 700.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 754 may also be shared between processors 752a-752n. Data structures, such as an index, may be stored, for example, across storage 756 and memory 754. Computing device 700 may include other components not shown, such as controllers, buses, input/output devices, communications modules, etc.

An entire system, such as system 100, may be made up of multiple computing devices 700 communicating with each other. For example, device 780a may communicate with devices 780b, 780c, and 780d, and these may collectively be known as system 100. As another example, system 100 of FIG. 1 may include one or more computing devices 700. Some of the computing devices may be located geographically close to each other, and others may be located geographically distant. The layout of system 700 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer system comprising:
   at least one processor; and
   memory storing:
      a graph-structured knowledge base of entities connected by relationships, and
      instructions that, when executed by the at least one processor, causes the computer system to perform operations comprising:
         receiving a span of text from a document and a quantity of phrases from the document for the span, the phrases representing a context for the span,
         determining that the span refers to a quantity of candidate entities from the knowledge base,
         for each of the quantity of candidate entities:
            providing the entity and the phrases as input to an additive context model, the context model having been trained to provide a support score for an entity-phrase pair,
            receiving one or more support scores from the additive context model for the entity,
            computing a first probability for the entity by adding the support scores together and dividing by the quantity of phrases, the first probability representing a likelihood that the context resolves to the entity,
            receiving a second probability representing a likelihood that the span resolves to the entity regardless of context, and
            computing a third probability for the entity by combining the first probability with the second probability, and
         resolving the span to an entity that has a highest third probability.

2. The system of claim 1, wherein the computer system comprises a plurality of entity servers and the context model is partitioned across the entity servers based on entity.

3. The system of claim 2, wherein the instructions include instructions that, when executed by the at least one processor, cause the computer system to further perform operations comprising:
   receiving a plurality of spans from the document, each span being associated with a respective context;
   determining entity servers associated with candidate entities for each of the spans;
   sending respective requests to the determined entity servers, each request causing a recipient entity server to provide input to its portion of the additive context model and compute the first probability based on support scores provided by the model; and
   receiving the first probabilities from the entity servers.

4. The system of claim 1, wherein a phrase in the quantity of phrases is a noun phrase from the document.

5. The system of claim 1, wherein the document is the text of a query.

6. The system of claim 1, wherein the instructions include instructions that, when executed by the at least one processor, cause the computer system to further perform operations comprising:
   training the additive context model using labeled data;
   using the trained additive context model on unlabeled data, resulting in labeling the unlabeled data, wherein each label assigned by the additive context model has an associated confidence score; and
   using data associated with labels having confidence scores that meet a threshold to re-train the context model.

7. The system of claim 6, wherein training the context model includes repeating using the trained context model on unlabeled data and re-training the context model until convergence.

8. The system of claim 1, wherein when the highest third probability does not meet a confidence threshold, the instructions include instructions that, when executed by the at least one processor, cause the system to resolve the span to an entity representing entities unknown to the knowledge base.

9. A method comprising:
   receiving a span of text from a document;
   receiving a phrase vector for the span, the phrase vector having a quantity of features and representing a context for the span;
   determining, using at least one silicon-based hardware processor, a quantity of candidate entities from a knowledge base for an ambiguous entity mention included in the span;
   for each of the quantity of candidate entities:
      determining, using the at least one silicon-based hardware processor, a support score for the candidate entity for each feature in the phrase vector,
      combining, using the at least one silicon-based hardware processor, the support scores additively, and
      computing, using the combined support scores, a probability that the span resolves to the candidate entity given the context; and resolving, using the at least one silicon-based hardware processor, the span to a candidate entity with a highest probability.

10. The method of claim 9, wherein when the highest probability does not meet a confidence threshold, the method includes resolving the span to an entity representing entities unknown to the knowledge base.

11. The method of claim 9, wherein the features of the phrase vector include noun phrases from the document and phrases coreferential with the span of text.

12. The method of claim 9, wherein the resolving is performed without a full coherency model.

13. The method of claim 9, wherein the probability is a first probability and the method further comprises:
for each candidate entity, combining the first probability with a second probability, the second probability representing a prior belief that the span refers to the candidate entity; and
resolving the span to the candidate entity with a highest combined probability.

14. The method of claim 9, wherein combining the support scores additively comprises:
computing a sum of the support scores for the candidate entity; and
dividing the sum by the quantity of features.

15. The method of claim 9, wherein the support score is stored in a context model that is partitioned across a plurality of entity servers, the partitioning being based on entity.

16. The method of claim 9, wherein the combining and calculating is performed according to the equation $$q_{m,e} = \frac{\sum_k b_{m,k} r_{k,e}}{\sum_k b_{m,k}},$$

which determines the probability q for a particular candidate entity e and a phrase vector b of features k for mention m.

17. A computer system comprising:
at least one hardware processor; and
memory storing instructions that, when executed by the at least one processor, cause the computer system to:
provide labeled data to an additive context model for training, the additive context model inferring a most likely entity for a mention given a context of the mention, the additive context model storing, for each feature, at least one support score-entity pair,
generate labels for unlabeled data using the trained model, the unlabeled data comprising entity mentions with respective phrase vectors, and where each label generated by the additive context model was based on additively combining support scores, and
re-train the model using the generated labels for the unlabeled data and the labeled data.

18. The computer system of claim 17, wherein the instructions further include instructions that, when executed by the at least one processor, cause the computer system to:
re-estimate the support scores of the context model after generating the labels;
determine whether the re-estimated support scores converge with the support scores of the model; and
perform the re-training and repeat generating the labels when the re-estimated support scores do not converge with the support scores of the model.

19. The computer system of claim 18, wherein re-estimating the support scores of the context model after iteration u is performed according to the equation of $$r_{f,e}^{(u)} = \frac{\sum_{i \in L \cup U} b_{i,f} q_{i,e}^{(u)}}{\sum_{i \in L \cup U} b_{i,f}},$$

where r is the support score of feature f for entity e, i is the entity mention from the set of labeled data L and the set of unlabeled data U, b is the phrase vector for mention i and q is a context posterior from generating the labels in iteration u.

20. The computer system of claim 17, wherein each generated label has an associated confidence score and the instructions include instructions that, when executed by the at least one processor, cause the computer system to use generated labels that meet a confidence threshold to re-train the model.

* * * * *